US006769016B2

(12) United States Patent
Rothwell et al.

(10) Patent No.: US 6,769,016 B2
(45) Date of Patent: Jul. 27, 2004

(54) INTELLIGENT SPAM DETECTION SYSTEM USING AN UPDATEABLE NEURAL ANALYSIS ENGINE

(75) Inventors: Anton C. Rothwell, Aylesbury (GB); Luke D. Jagger, Aylesbury (GB); William R. Dennis, Aylesbury (GB); David R. Clarke, Congleton (GB)

(73) Assignee: Networks Associates Technology, Inc., Santa Clara, CA (US)

( * ) Notice: Subject to any disclaimer, the term of this patent is extended or adjusted under 35 U.S.C. 154(b) by 0 days.

(21) Appl. No.: 09/916,930

(22) Filed: Jul. 26, 2001

(65) Prior Publication Data

US 2003/0088627 A1 May 8, 2003

(51) Int. Cl.[7] ................................................ G06F 15/16
(52) U.S. Cl. ...................... 709/206; 709/202; 709/206; 709/207; 709/229; 706/20; 706/200; 707/1; 707/101; 707/500; 715/534; 715/535; 715/538
(58) Field of Search ................................ 709/206, 207; 706/15

(56) References Cited

U.S. PATENT DOCUMENTS

| | | | |
|---|---|---|---|
| 5,121,345 A | | 6/1992 | Lentz .......................... 364/550 |
| 5,509,120 A | | 4/1996 | Merkin et al. ............... 395/186 |
| 5,619,648 A | | 4/1997 | Canale et al. .......... 395/200.01 |
| 5,623,600 A | | 4/1997 | Ji et al. .................. 395/187.01 |
| 5,805,911 A | * | 9/1998 | Miller |
| 5,845,285 A | * | 12/1998 | Klein |
| 6,023,723 A | * | 2/2000 | McCormick et al. |
| 6,047,277 A | * | 4/2000 | Parry et al. |
| 6,052,709 A | | 4/2000 | Paul ........................... 709/202 |
| 6,092,101 A | * | 7/2000 | Birrell et al. |
| 6,101,531 A | * | 8/2000 | Eggleston et al. |
| 6,161,130 A | | 12/2000 | Horvitz et al. ............... 709/206 |
| 6,167,434 A | * | 12/2000 | Pang |
| 6,189,002 B1 | * | 2/2001 | Roitblat |
| 6,330,590 B1 | * | 12/2001 | Cotton |
| 6,393,465 B2 | * | 5/2002 | Leeds |
| 6,453,327 B1 | * | 9/2002 | Nielson |

FOREIGN PATENT DOCUMENTS

| | | | |
|---|---|---|---|
| WO | 98/37680 A2 | 8/1998 | |
| WO | 99/67731 | 12/1999 | ........... G06F/17/60 |

OTHER PUBLICATIONS

PCT WO 98/37680, Robert H. Franz, E–Mail Server for Message Filtering and Routing, Aug. 27, 1998.*
Tim Bass, Lt. Col. Glenn Watt, "A Simple Framework For Filtering Queued SMTP Mail", 1997, IEEE, pp. 1140–1144.*
Keith C. Ivey, "Spam: The Plague of Junk E–Mail", Apr. 1998, EEI Communications, pp. 15–16.*
Harris Ducker, "Support Vector Machines for Spam Categorization", Sep. 1999, IEEE Transactions onNeural Networks, vol. 10, No. 5, pp. 1048–1054.*
Ivey, Keith C., "Information Superhighway, Spam: The Plague of Junk E–Mail", Apr. 1998, EEI Press, Alexandria, Virginia.

* cited by examiner

Primary Examiner—Hosain Alam
Assistant Examiner—Young N Won
(74) Attorney, Agent, or Firm—Silicon Valley IP Group, PC; Kevin J. Zilka; Christopher J. Hamaty

(57) ABSTRACT

A system, method and computer program product are provided for detecting an unwanted message. First, an electronic mail message is received. Text in the electronic mail message is decomposed. Statistics associated with the text are gathered using a statistical analyzer. A neural network engine coupled to the statistical analyzer is taught to recognize unwanted messages based on statistical indicators. The statistical indicators are analyzed utilizing the neural network engine for determining whether the electronic mail message is an unwanted message.

12 Claims, 8 Drawing Sheets

INTELLIGENT SPAM DETECTION SYSTEM USING AN UPDATEABLE NEURAL ANALYSIS ENGINE

RELATED APPLICATION(S)

The present application is related to a co-pending application entitled "INTELLIGENT SPAM DETECTION SYSTEM USING STATISTICAL ANALYSIS" which was invented by Anton C. Rothwell, Luke D. Jagger, William R. Dennis, and David R. Clarke, and filed concurrently herewith under application Ser. No. 09/916,599 and under attorney docket number NAI1P022/01.106.01.

FIELD OF THE INVENTION

The present invention relates to SPAM detection methods, and more particularly to intelligently detecting and removing SPAM.

BACKGROUND OF THE INVENTION

The rapid increase in the number of users of electronic mail and the low cost of distributing electronic messages, for example, via the Internet and other communications networks has made mass marketing via electronic mail ("e-mail") an attractive advertising medium. Consequently, e-mail is now frequently used as the medium for widespread marketing broadcasts of unsolicited messages to e-mail addresses, commonly known as "SPAM."

Electronic mass marketers (also called "spammers") use a variety of techniques for obtaining e-mail address lists. For example, marketers obtain e-mail addresses from postings on various Internet sites such as news group sites, chat room sites, or directory services sites, message board sites, mailing lists, and by identifying "mailto" address links provided on web pages. Using these and other similar methods, electronic mass marketers may effectively obtain large numbers of mailing addresses, which become targets for their advertisements and other unsolicited messages.

Users of Internet services and electronic mail, however, are not eager to have their e-mail boxes filled with unsolicited e-mails. This is an increasing problem for Internet service providers (ISPs) such as America Online (AOL®) or Microsoft Network (MSN®) and other entities with easily identifiable e-mail addresses such as large corporations (e.g., IBM®, Microsoft®, General Motors®, etc.). ISPs object to junk mail because it reduces their users' satisfaction of their services. Corporations want to eliminate junk mail because it reduces worker productivity.

To date, the prior art has been devoid of mechanisms that can block SPAM effectively. Traditionally, SPAM detection has been based around specific rules for detecting it. Such rules include searching for key phrases in the subject headers, determining whether the recipient is actually on the list of users to receive the e-mail, etc.

More particularly, prior art systems rely on a set rule-base or on blocking based on simple mail fields such as sender, subject, mail body, etc. As Spammers become more creative in their mailings, it is increasingly difficult to block unwanted messages based on fixed information. Text search mechanisms in particular often generate a number of misses or "falses" due to the limitations of the searching mechanisms.

In particular, such text search mechanisms traditionally utilize static logic for locating particular known strings. This is often insufficient due to the dynamic manner in which spamming methods change over time. Thus, what is needed is a process for dynamically and intelligently detecting unwanted SPAM electronic mail messages.

DISCLOSURE OF THE INVENTION

A system, method and computer program product are provided for detecting an unwanted message. First, an electronic mail message is received. Text in the electronic mail message is decomposed. Statistics associated with the text are gathered using a statistical analyzer. A neural network engine coupled to the statistical analyzer is taught to recognize unwanted messages based on statistical indicators. The statistical indicators are analyzed utilizing the neural network engine for determining whether the electronic mail message is an unwanted message.

As mentioned above, the neural network engine can be taught to recognize unwanted messages. In one process of teaching the neural network, examples are provided to the neural network engine. The examples are of wanted messages and unwanted messages. Each of the examples is associated with a desired output. Each of the examples is processed with statistics by the neural network engine for generating weights for the statistics. Each of the weights is used to denote wanted and unwanted messages. Preferably, the neural network engine utilizes adaptive linear combination for adjusting the weights. Logic associated with the neural network engine is updated based on the processing by the neural network engine.

In another process for teaching the neural network engine, the neural network engine is updated to recognize an unwanted message. The message is identified as an unwanted message. The features of the message that make the message unwanted are identified, wherein the identified features are stored and used by the neural network to identify subsequent unwanted messages. Preferably, a graphical user interface is provided for allowing a user to identify the features of the message that make the message unwanted.

In another aspect of the present embodiment, the neural network engine uses artificial intelligence that analyzes previous user input for determining whether the message is unwanted.

A system, method and computer program product are also provided for teaching a neural network engine to recognize an unwanted message. Examples are provided to a neural network engine. The examples are of wanted messages and unwanted messages. Each of the examples is associated with a desired output. Each of the examples is processed with statistics for generating weights for the statistics. Each of the weights is used to denote wanted and unwanted messages. Logic associated with the neural network engine is updated based on the processing by the neural network engine.

In one aspect of the present embodiment, the neural network engine utilizes adaptive linear combination for adjusting the weights. In another aspect of the present embodiment, the neural network engine is updated to recognize an unwanted message. The message is identified as an unwanted message. The features of the message that make the message unwanted are identified. The identified features are stored and used by the neural network to identify subsequent unwanted messages. Preferably, a graphical user interface is provided for allowing a user to identify the features of the message that make the message unwanted.

DESCRIPTION OF THE PREFERRED EMBODIMENTS

Figure 1:
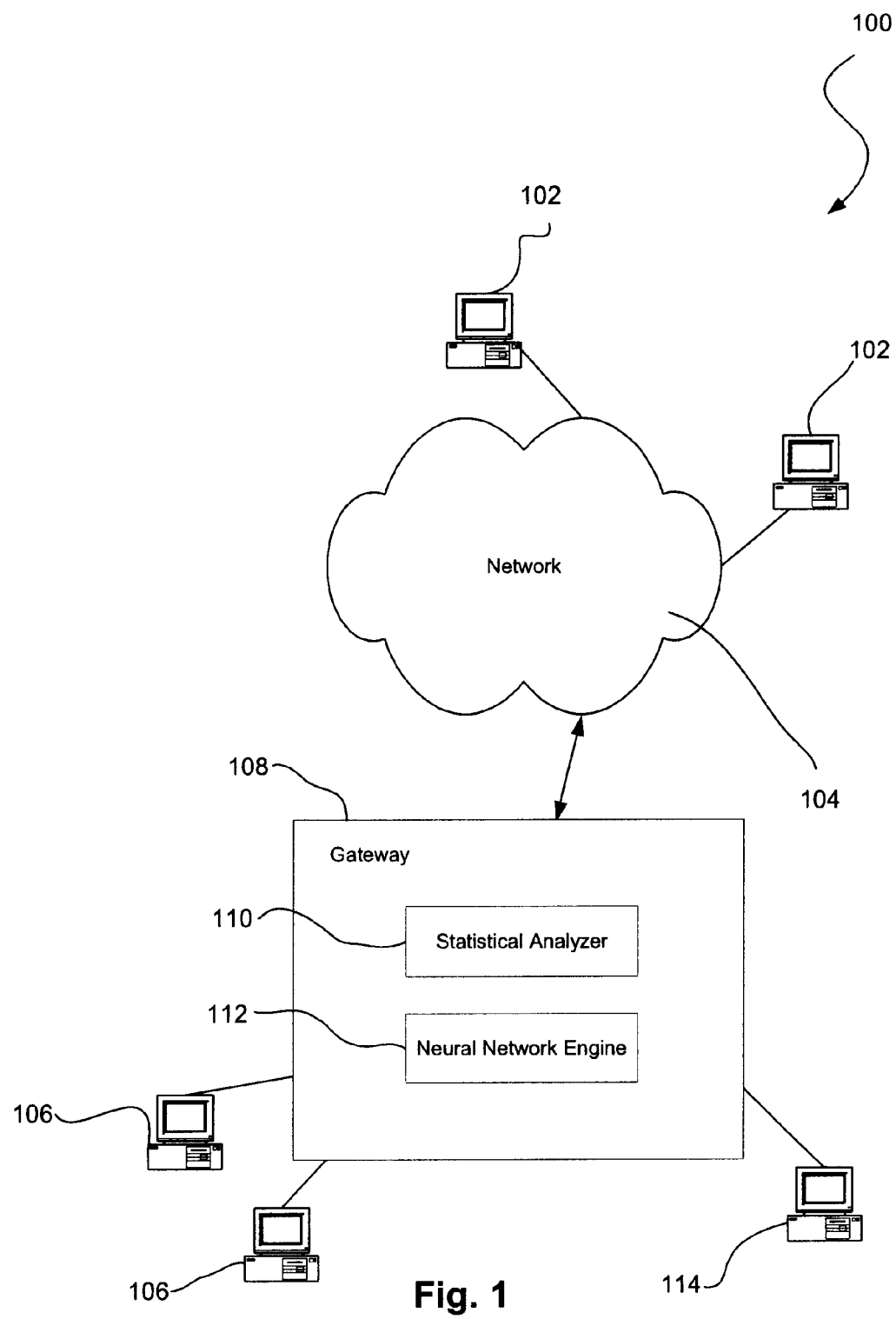
FIG. 1 illustrates a network architecture in accordance with the one embodiment.

FIG. 1 illustrates a network architecture 100, in accordance with the one embodiment. As shown, computers 102 of remote users are connected to a network 104. The remote users send electronic mail messages (e-mail) to local users, who receive them on computers 106. In the context of the present network architecture, the network may take any form including, but not limited to a local area network (LAN), a wide area network (WAN) such as the Internet, etc. The computers can include a desktop computer, laptop computer, hand-held computer, etc.

The e-mail passes through a gateway 108 which analyzes the messages to determine whether they are SPAM prior to allowing the message to pass to the local users. In one embodiment, the gateway 108 may include an Internet gateway, intranet gateway, Internet proxy, intranet proxy, or any other type of intermediate device. The gateway includes a statistical analyzer 110 and a neural network engine 112.

In use, the statistical analyzer decomposes the electronic messages to determine an amount of various SPAM indicators (i.e. capitalization, punctuation, URLs, phone numbers, etc.). Instead of using static rule-based logic to accept or reject the electronic messages based on the results of the statistical analyzer, the results of the parsing are passed to the neural network engine. The neural network engine is first "taught" the difference between SPAM and non-SPAM electronic messages based on the aforementioned SPAM indicators. This is done by processing hundreds of electronic messages that are known to be SPAM or known to be non-SPAM. Once taught, the neural network engine can be used in combination with the statistical analyzer to accept or deny electronic messages. An administrator 114 in communication with the gateway can be allowed to manipulate operation of the gateway and its components.

Figure 2:
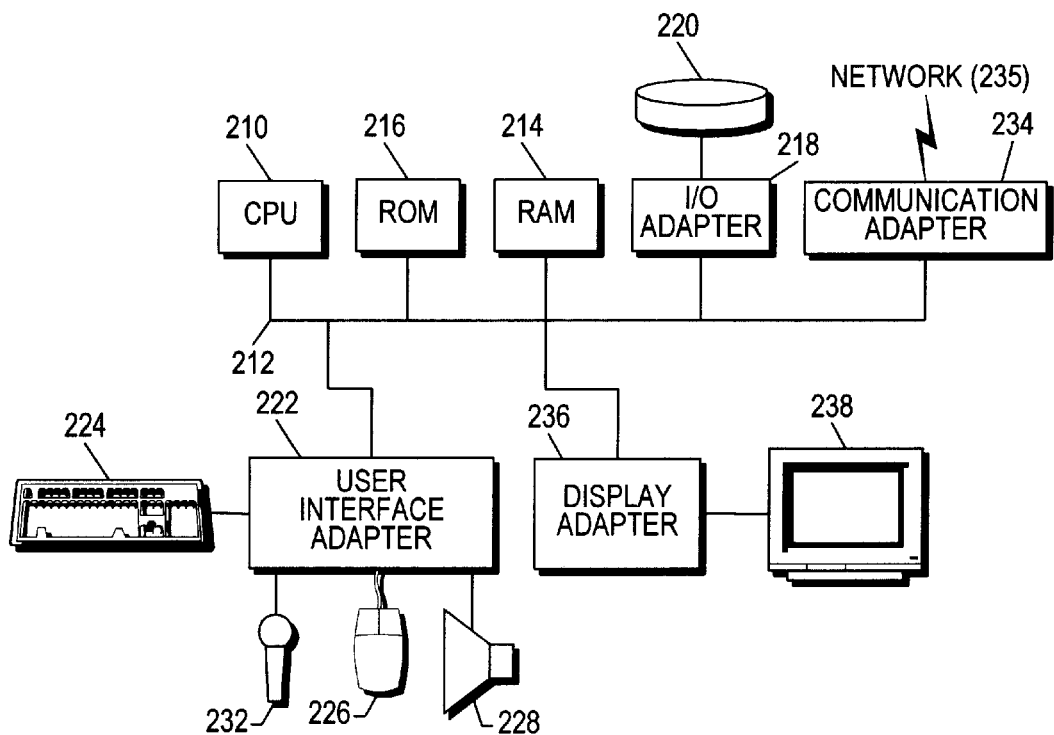
FIG. 2 shows a representative hardware environment associated with the computers of FIG. 1.

FIG. 2 shows a representative hardware environment that may be associated with the remote source 102 and/or target 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, Linux or other UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Spam Detection

Figure 3:
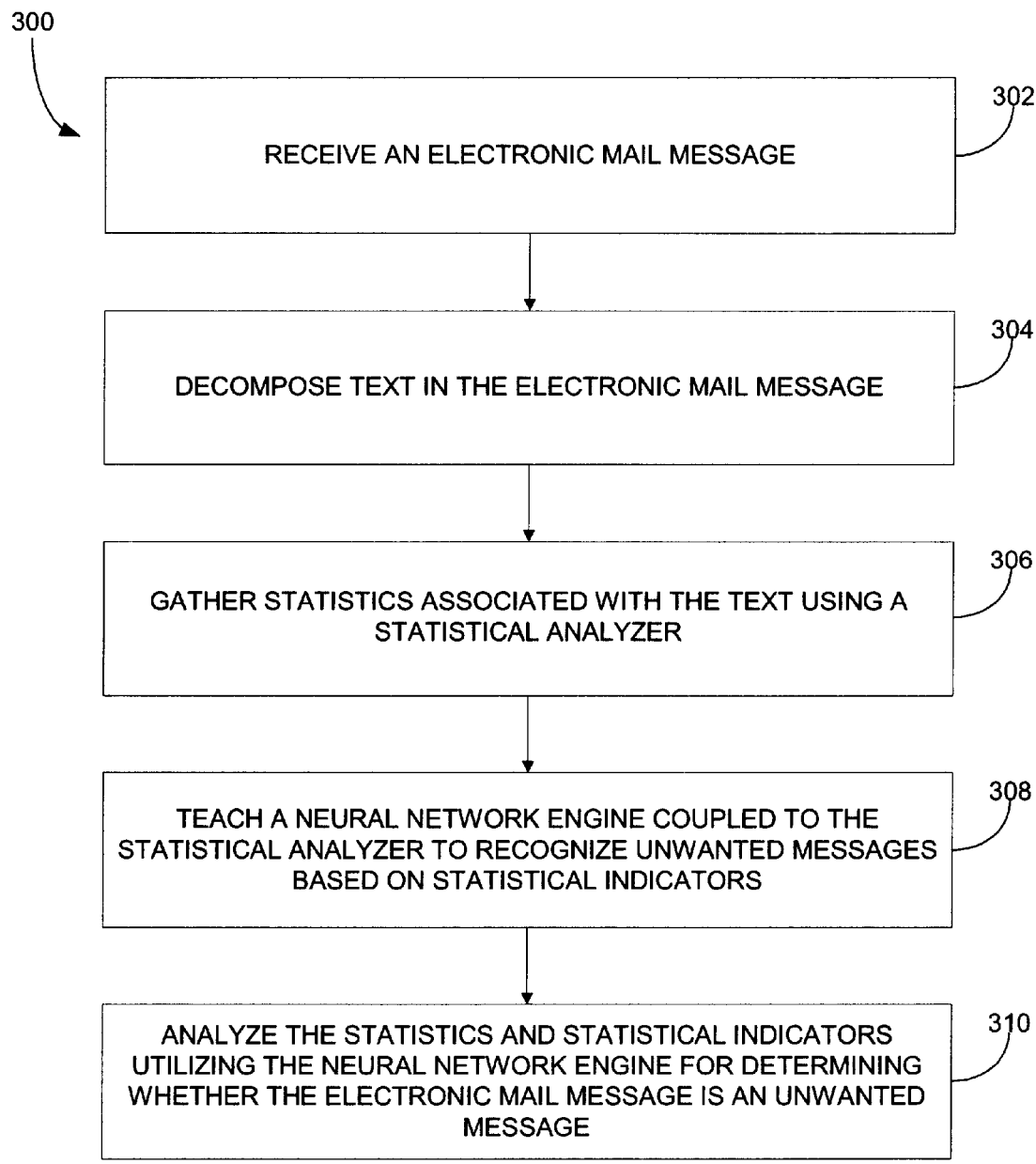
FIG. 3 is a flow diagram of a process for detecting an unwanted message.

FIG. 3 is a flow diagram of a process 300 for detecting an unwanted message. In operation 302, an electronic mail message is received. Text in the electronic mail message is decomposed in operation 304. Statistics associated with the text are gathered in operation 306 using a statistical analyzer. This may be accomplished utilizing various methods such as analyzing character type, i.e. Unicode, etc. In operation 308, a neural network engine coupled to the statistical analyzer is taught to recognize unwanted messages based on statistical indicators. The statistics are analyzed in operation 310 utilizing the neural network engine for determining whether the electronic mail message is an unwanted message.

According to another embodiment, a method is provided by which it is possible to accurately detect SPAM by applying statistical calculations against the text content of the message and supply the results of the application of the calculations and the message text contents itself into a neural network engine. The neural network then attempts to determine whether the message is SPAM or not based on what the neural network has learned in the past and/or by comparison with an existing set of known SPAM. An additional mechanism can be provided so that a user can return a message to the SPAM engine and mark it as SPAM (or not SPAM) to provide the engine with an on-going learning capability.

Architecture

Figure 4:
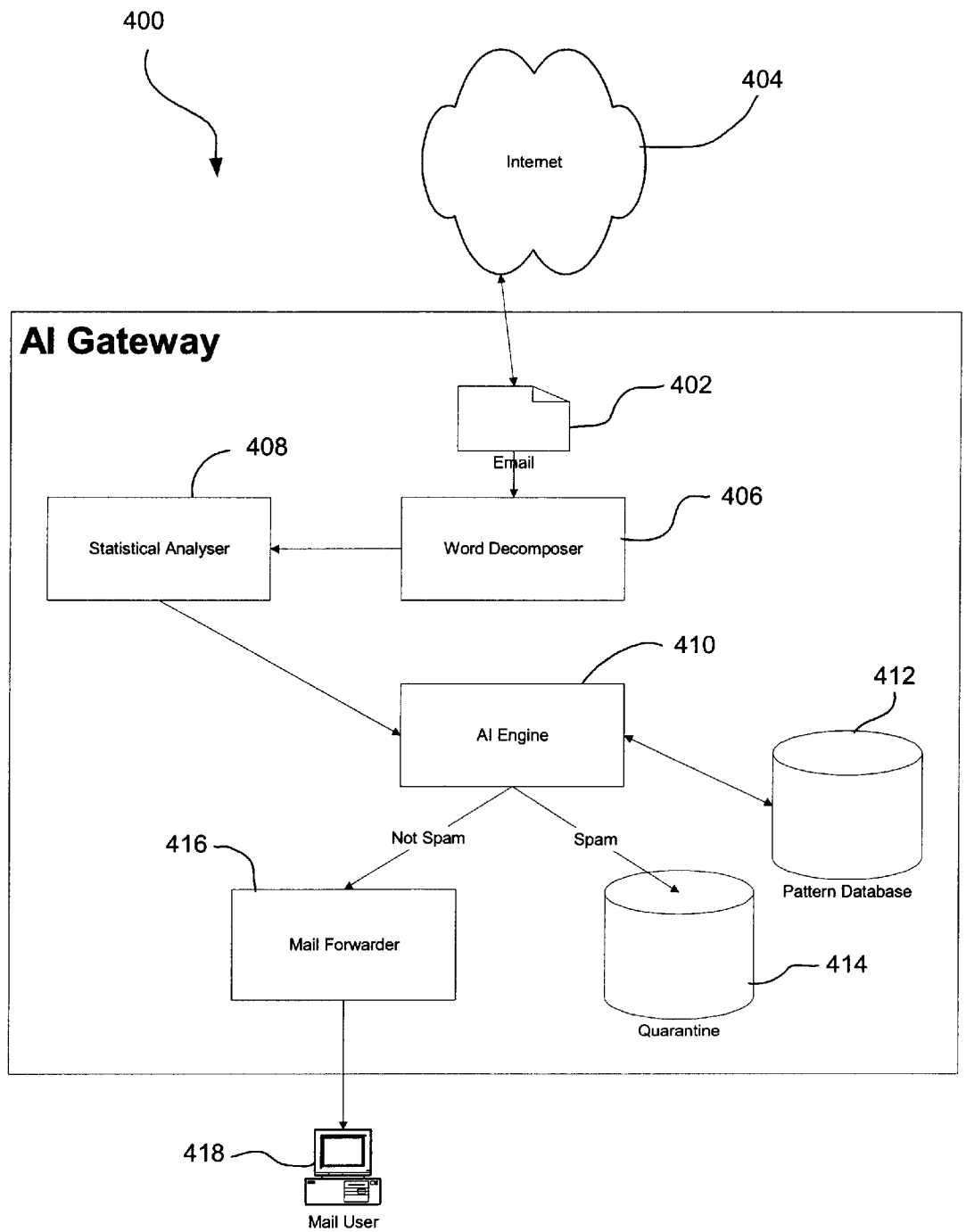
FIG. 4 depicts an illustrative architecture according to an embodiment.

FIG. 4 depicts an illustrative gateway architecture 400 according to an embodiment. The e-mail 402 arrives from the Internet 404 at the word decomposer 406, which breaks the text content into words and punctuation. The parsed text is then supplied to the statistical analyzer 408 which creates a table of variables relating to the message, e.g.: Total Number of words, Number of words capitalized, Punctuation to word ratio etc. See Table 1 and related discussion, below.

This table along with the decomposed word list is supplied to the neural network 410 which provides a weighting, or probability, that the message is SPAM, partially based on known patterns of SPAM messages stored in a pattern database 412. If the message is determined to be SPAM, it is quarantined in a quarantine database 414. If the message is determined not to be SPAM, the message is sent to a mail forwarder 416, which forwards the message to a user 418.

Statistical Word Analyzer

The Statistical Word Analyzer attempts to build some key facts about the text content. The facts are based on certain characteristics that users/administrators have determined could represent SPAM. A results table from analysis of the message is then built.

At that point, the program segment shown in Example 1 may be used.

EXAMPLE 1

If words_capitalized >5% and total_punc>20%
    And perc_plink >50% And URL analysis fails
    And E-mail address analysis fails Then
        This is spam
Else
    This is not Spam
End If However, questions may arise as to whether the above analysis is accurate for all SPAM, whether the percentages are right, or whether the test variables are the correct ones to use.

Because this task is difficult to do using a fixed algorithm, the statistical analysis ends at this point and this data is passed to the Neural Network engine to determine patterns in statistics and words, and use these to determine whether the message is SPAM based on comparing the patterns to patterns predetermined to be SPAM or non-SPAM. The greater the number of variables in the statistics table, the easier it is for the Artificial Intelligence engine (AI) to "learn" to differentiate between SPAM and genuine messages.

The AI solution provides two goals. In particular, the AI is used to produce a set of rules that can be used in an existing AI engine. Further, the AI engine is used as a standalone gateway for determining which messages are SPAM.

Table 1 illustrates various steps and/or functions to achieving these goals.

TABLE 1

Pre-train the system with known SPAM from an archive of known SPAM, such as http://www.annexia.org/spam/ "The Great Spam Archive".
User Interface (UI) modification of the AI. A point and click UI where an existing e-mail is selected and displayed to be made an example of. Rules are constructed from the areas of the example mail that classify it as SPAM. See the section entitled Feature Editor Applet, below for a more detailed description.
Application of a tiered approach, in which the user sends the message to an administrative area. An administrator utilizes the UI to notify the engine.
Artificial Intelligence introduced to make decisions based on previous Administrative input. This may include statistical or pattern-matching intelligence and would automatically update the rule-base.
Artificial Intelligence taken a level further, where grammatical and language decisions are made based on previous human-input to provide automatic generation of a rule-base.
System opened up to internal users with encryption method for trusted SPAM identification by the users.

For more information regarding the statistical word analyzer, reference may be made to a co-pending application entitled "INTELLIGENT SPAM DETECTION SYSTEM USING STATISTICAL ANALYSIS" which was filed concurrently herewith under application Ser. No. 09/916,599 and under attorney docket number NAI1P022/01.106.01, and which is incorporated herein by reference in its entirety.

Neural Network Engine

The statistics table is passed as inputs to the Artificial Neural Network (ANN). The preferred ANN is a Supervised Learning type, though other types can be used. In this type, a "teacher" (user, administrator, or computer application) shows examples of inputs that the engine will receive paired with desired outputs. An error value is produced between the desired and actual responses, which should reduce as the learning progresses.

Figure 5:
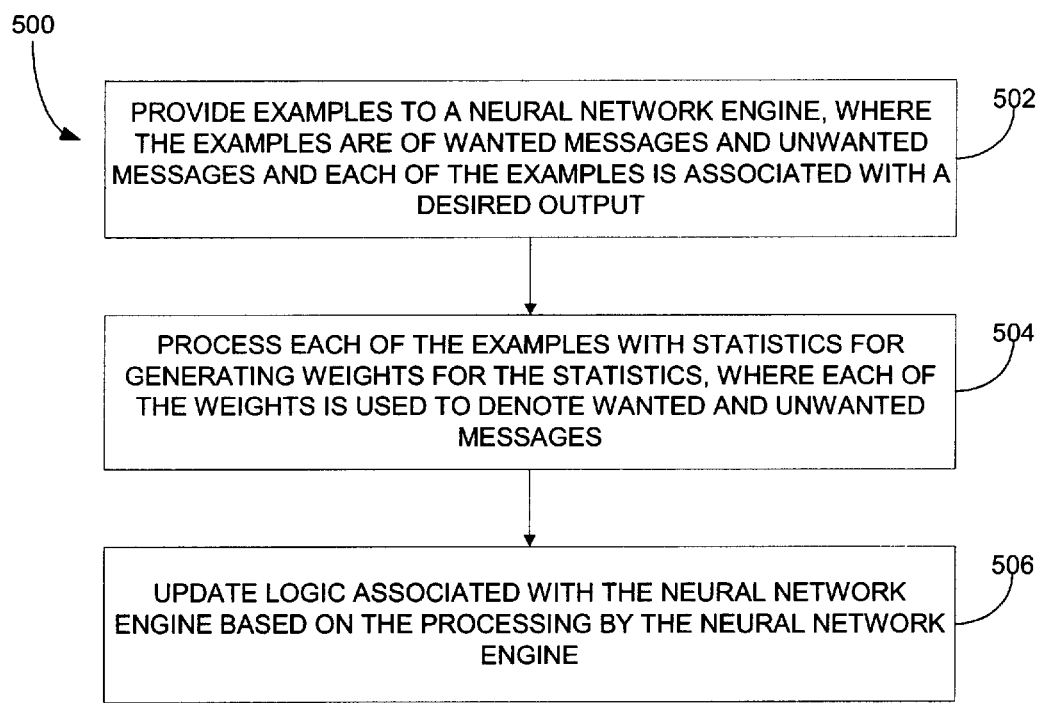
FIG. 5 is a flowchart of a process for teaching a neural network engine to recognize an unwanted message.

FIG. 5 is a flowchart of a process 500 for teaching a neural network engine to recognize an unwanted message. In operation 502, examples are provided to a neural network engine. The examples are of wanted messages and unwanted messages. Each of the examples is associated with a desired output. In operation 504, each of the examples is processed with statistics for generating weights for the statistics. Each of the weights is used to denote wanted and unwanted messages. Logic associated with the neural network engine is updated in operation 506 based on the processing by the neural network engine.

In the SPAM context, there are two sets of inputs: First, an archive containing only SPAM is inputted, and secondly an archive containing only genuine (non-SPAM) messages is inputted. Known SPAM can be obtained from various online resources (http://www.annexia.org/spam/"The Great Spam Archive"). The teacher may automatically and randomly pick messages from either archive and supply them (with the statistical table) to the ANN together with a value for SPAM or non-SPAM. This continues until the archives are exhausted. A very large data set possibly consisting of over 500,000 messages is preferred.

Each input message is expressed as a vector, each variable from the statistic table being a feature variable in the vector. Note Table 2.

TABLE 2

| | |
|---|---|
| X = | Capitals |
| | Punctuation |
| | Dollars |

Figure 6:
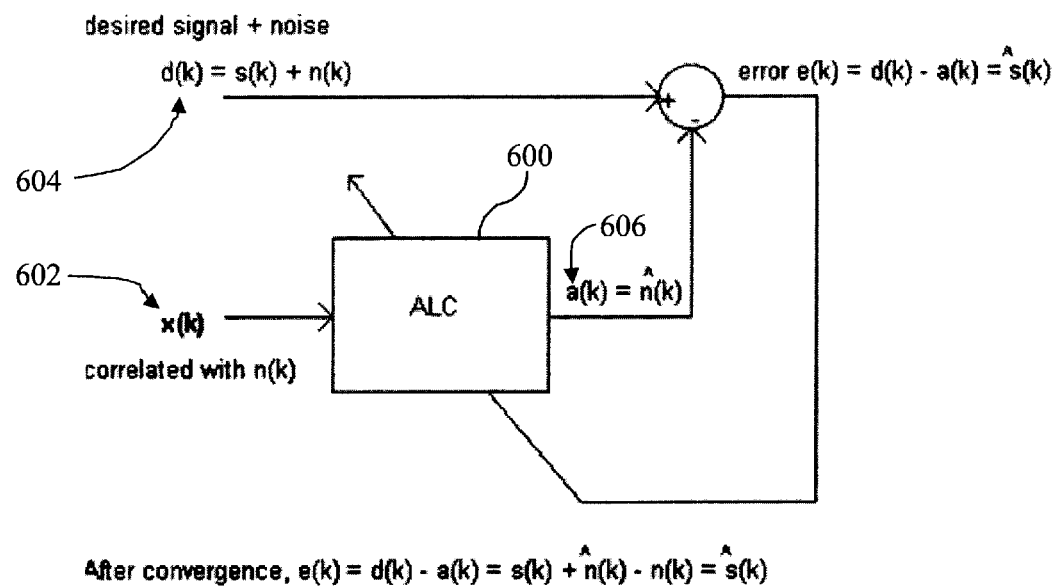
FIG. 6 is a flow diagram depicting processing performed by the neural network engine.

FIG. 6 is a flow diagram depicting processing performed by the ANN. The most appropriate form of ANN would be an Adaptive Linear Combiner (ALC) 600, which allows the presentation of input vectors X 602 and desired responses d 604 to the ALC. This will adjust weights until outputs a 606 are close to the desired responses.

After the learning process has taken place, the Engine can be deployed into the gateway situation. All associated vectors, matrices and weights to be used with the ALC can be stored permanently on disk.

The gateway could also be used to monitor intercommunication between Internet servers for tighter company-wide security, such as for preventing outbreak, SPAM, hacking attempts, etc. Such functionality can extend to the whole Internet community.

In addition to the pre-learning, there can also be an interactive learning mechanism while the gateway is active. This is discussed in the next section.

User Teaching Mechanism

Figure 7:
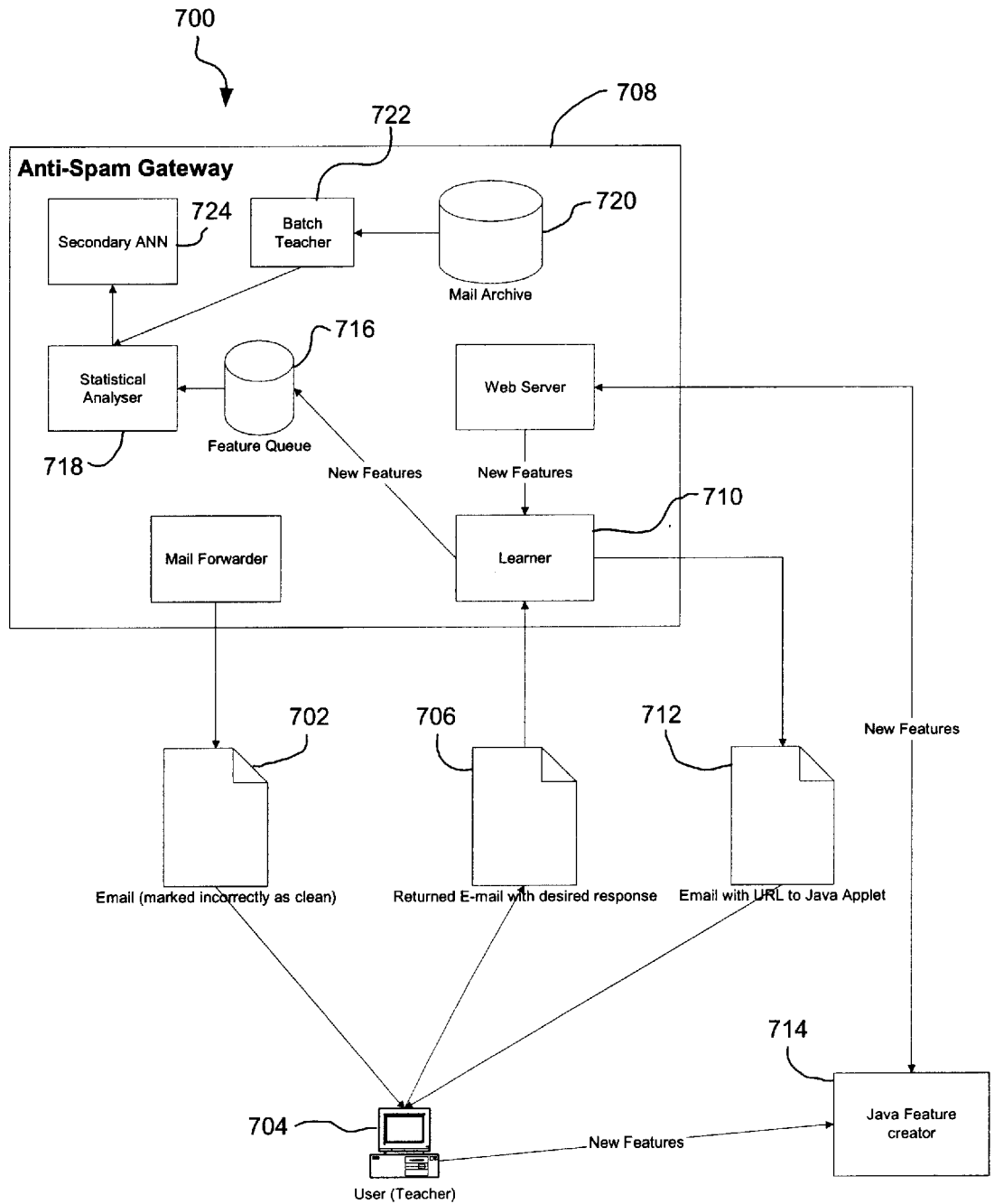
FIG. 7 illustrates a system for allowing a user to teach the neural network engine to recognize unwanted messages.

Some users of the system will be given permissions to allow teaching the Spam Engine when new mail arrives. FIG. 7 illustrates the system that allows such teaching.

A typical sequence of actions using the system would be as follows. E-mail 702 is received by a user teacher 704, but the e-mail has been marked incorrectly as clean. The user returns the e-mail 706 back to the Gateway 708 but indicates the desired response as "Spam." A learner 710 in the Gateway receives the e-mail and desired response. The Gateway stores the e-mail creating a unique ID for it. The Gateway sends a new e-mail 712 to the user. The new e-mail contains a unique ID contained within a URL to the Feature Editor (Java Applet) 714. The user clicks on URL and indicates which features of the text of the e-mail make it SPAM. Preferably, the user is allowed to select the parts of the mail that clearly define it to be SPAM/offensive (e.g. subject, body, sender, attachments etc) and then within each part refine it down to the data elements to search on for CF filtering (set of words, file name/type for attachment, sender domain etc). The results of the user input are passed into a feature queue 716.

The new features are not applied directly to the Statistical Analyzer/AI Engine 718 in one embodiment because the ANN would have to be reset and re-learn its mail archive 720. Instead, a batch teacher 722 schedules an entire learning run at a scheduled interval with additional features from the feature queue. A secondary ANN 724 is used so that the primary ANN can stay active and continue to process e-mail while the secondary ANN is learning. When the learning process is finished, the primary ANN becomes the secondary ANN and vice versa. The AI Engine is then initialized with the new features.

The AI engine could optionally be configured to divide SPAM into different confidence levels, e.g. Definitely SPAM, definitely not SPAM and possibly SPAM. The possibly SPAM would still be forwarded to the recipient, but also copied to a user teacher for feeding manual categorization in future training.

Feature Editor Applet

Figure 8:
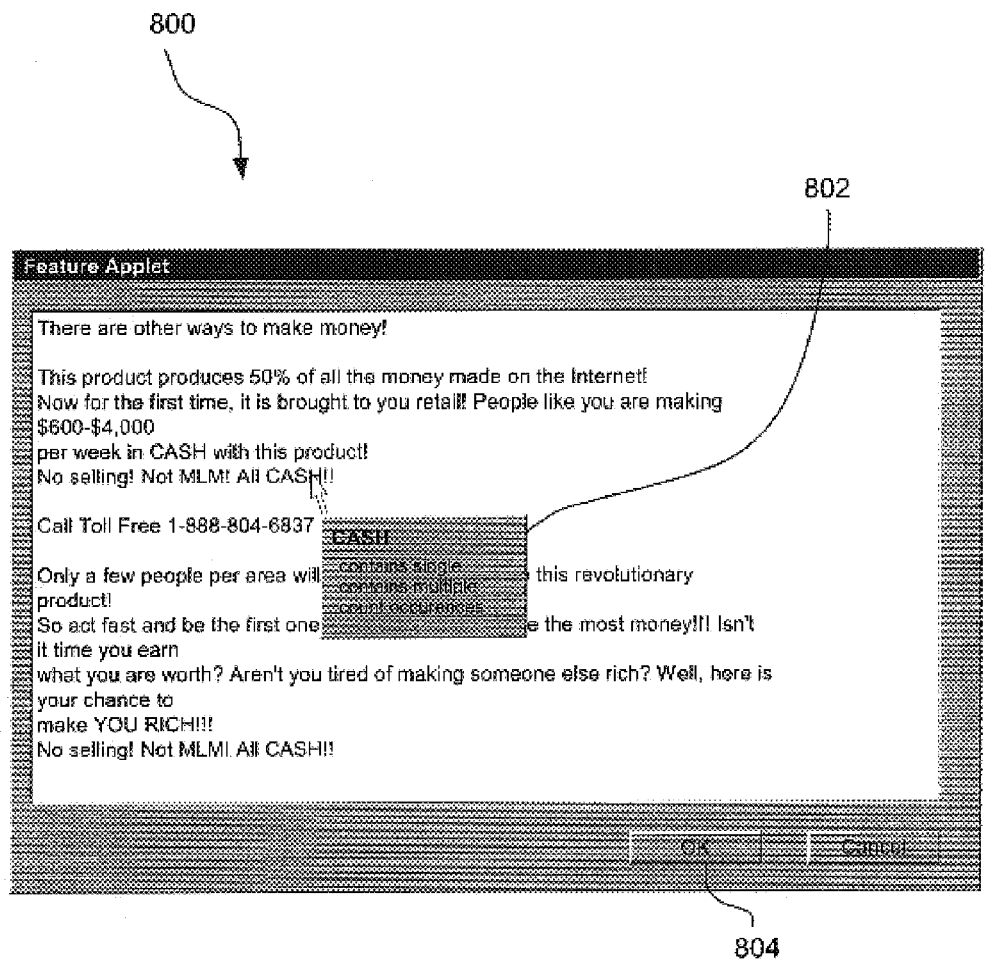
FIG. 8 illustrates a user interface used in conjunction with the system of FIG. 7.

FIG. 8 illustrates the user interface 800 for applying features to the text of an e-mail. The user is able to highlight areas of text and select (right click) from a pop up menu 802 a measurement to apply to this text. Such measurements are shown in Table 3.

TABLE 3

Contains a single instance of word = true/false
Contains multiple instances of word = true/false
Count number of occurrences of word = Number
Ratio of word to total number of words = Percentage Selection of multiple words is also possible. Additional measurements will then be applied. Note Table 4.

TABLE 4

All words must exist = true/false
Some words can exist = true/false
Multiple instances of all words must exist = true/false
Multiple instances of some words must exist = true/false
Ratio of all words to total number of words = Percentage
Ratio of some words to total number of words = Percentage When the OK button 804 is selected, these additional measurements are added to the feature queue for future inclusion in a batch teaching session. It is also possible for an administrator to review and edit the additional features before a batch run takes place.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for detecting an unwanted electronic mail message, comprising:

receiving user input via a graphical user interface, the user input including indicators of unwanted electronic mail messages, wherein the indicator for a particular unwanted message includes at least one of a URL, a sender, and domain of a sender, the graphical user interface further including a window for displaying to a user all of the text of the entire particular unwanted message and permitting the user to highlight text of the particular unwanted message in the window, a menu including the highlighted text and a list of a plurality of measurements for selecting at least one of the measurements to apply to the highlighted text, and a button for adding the selected measurements to the indicators, wherein the measurements each correspond to a unique specific condition associated with the highlighted text that must be met before an electronic mail message is to be classified as unwanted;

storing the user input indicators in a database;

receiving an electronic mail message prior to delivery of the electronic mail message to an intended recipient of the electronic mail message;

analyzing the electronic mail message using the user input indicators stored in the database;

classifying the electronic mail message as unwanted, possibly unwanted, and wanted based on the analysis using the user input indicators stored in the database;

sending the electronic mail message to the intended recipient if the electronic mail message is not determined to be unwanted; and selecting a disposition of the electronic mail message if the electronic mail message is determined to be unwanted, the disposition selected from the group consisting of not delivering the electronic mail message to the intended recipient, sending the electronic mail message to an administrator, and sending the electronic mail message to a quarantine.

2. The method as recited in claim 1, wherein the measurements to apply to the highlighted text are selected from the menu utilizing a right-click action of a mouse and a pop-up window.

3. The method as recited in claim 1, wherein the measurements include a plurality of instances of the highlighted text.

4. The method as recited in claim 1, wherein the measurements include a count of a number of instances of the highlighted text.

5. The method as recited in claim 1, wherein the measurements include a ratio of the highlighted text with respect to a total number of words.

6. The method as recited in claim 1, wherein the graphical user interface is further adapted to allow review of the measurements.

7. The method as recited in claim 1, wherein the graphical user interface includes an applet.

8. The method as recited in claim 1, wherein the graphical user interface is displayed in response to the selection of a uniform resource locator.

9. The method as recited in claim 8, wherein the uniform resource locator is included in an electronic mail message sent to the user.

10. The method as recited in claim 9, wherein the electronic mail message including the uniform resource locator is sent to the user in response to the submission by the user of an electronic mail message determined to be unwanted.

11. A computer program product for detecting an unwanted electronic mail message, comprising:

computer code for receiving user input via a graphical user interface, the user input including indicators of unwanted electronic mail messages, wherein the indicator for a particular unwanted message includes at least one of a URL, a sender, and domain of a sender, the graphical user interface further including a window for displaying to a user all of the text of the entire particular unwanted message and permitting the user to highlight text of the particular unwanted message in the window, a menu including the highlighted text and a list of a plurality of measurements for selecting at least one of the measurements to apply to the highlighted text, and a button for adding the selected measurements to the indicators, wherein the measurements each correspond to a unique specific condition associated with the highlighted text that must be met before an electronic mail message is to be classified as unwanted;

computer code for storing the user input indicators in a database;

computer code for receiving an electronic mail message prior to delivery of the electronic mail message to an intended recipient of the electronic mail message;

computer code for analyzing the electronic mail message using the user input indicators stored in the database;

computer code for classifying the electronic mail message as unwanted, possibly unwanted, and wanted based on the analysis using the user input indicators stored in the database;

computer code for sending the electronic mail message to the intended recipient if the electronic mail message is not determined to be unwanted; and computer code for selecting a disposition of the electronic mail message if the electronic mail message is determined to be unwanted, the disposition selected from the group consisting of not delivering the electronic mail message to the intended recipient, sending the electronic mail message to an administrator, and sending the electronic mail message to a quarantine.

12. A method for detecting an unwanted electronic mail message, comprising:

receiving user input via a graphical user interface, the user input including indicators of unwanted electronic mail messages, wherein the indicator for a particular unwanted message includes at least one of a URL, a sender, and domain of a sender, the graphical user interface further including a window for displaying to a user all of the text of the entire particular unwanted message and permitting the user to highlight text of the particular unwanted message in the window, a menu including the highlighted text and a list of a plurality of measurements for selecting at least one of the measurements to apply to the highlighted text, and a button for adding the selected measurements to the indicators, wherein the measurements each correspond to a unique specific condition associated with the highlighted text that must be met before an electronic mail message is to be classified as unwanted, the graphical user interface further adapted to allow the user to review the measurements, the measurements to apply to the highlighted text being selected from the menu utilizing a right-click action of a mouse, the measurements including the existence of a plurality of instances of the highlighted text, a count of the number of instances of the highlighted text, a ratio of the highlighted text with respect to a total number of words, the graphical user interface including an applet displayed in response to the selection of a uniform resource locator included in an electronic mail message sent to the user in response to the submission by the user of an electronic mail message determined to be unwanted; the user input being encrypted at least in part;

storing the user input indicators in a database;

receiving an electronic mail message prior to delivery of the electronic mail message to an intended recipient of the electronic mail message;

analyzing the electronic mail message using the user input indicators stored in the database;

analyzing the electronic mail message using data collected from a public archive of known unwanted messages;

analyzing the electronic mail message using a neural network engine by:
gathering statistics associated with the text using a statistical analyzer by analyzing a character type including Unicode,
teaching the neural network engine coupled to the statistical analyzer to recognize unwanted messages based on statistical indicators, wherein the teaching of the neural network engine includes identifying a message as an unwanted message, the features of the message that make the message unwanted are identified, and the identified features are stored and used by the neural network engine to identify subsequent unwanted messages, wherein the unwanted messages are each expressed as a vector with a plurality of variables selected from the group consisting of capitals, punctuation, and dollars from a statistics table, and
analyzing the statistical indicators utilizing the neural network engine, classifying the electronic mail message as unwanted, possibly unwanted, and wanted based on the analysis using the user input indicators stored in the database, the analysis using data collected from an archive of known unwanted messages, and the analysis using the neural network engine;

sending the electronic mail message to the intended recipient if the electronic mail message is not determined to be unwanted;

selecting a disposition of the electronic mail message if the electronic mail message is determined to be unwanted, the disposition selected from the group including not delivering the electronic mail message to the intended recipient, sending the electronic mail message to an administrator, and sending the electronic mall message to a quarantine; and allowing configuration of analysis parameters while simultaneously performing the analyses.

* * * * *

UNITED STATES PATENT AND TRADEMARK OFFICE
CERTIFICATE OF CORRECTION

PATENT NO.        : 6,769,016 B2
APPLICATION NO.   : 09/916930
DATED             : July 27, 2004
INVENTOR(S)       : Rothwell et al.

It is certified that error appears in the above-identified patent and that said Letters Patent is hereby corrected as shown below:

In the claims:
col. 10, line 54, change "mall" to --mail--.

Signed and Sealed this

Thirtieth Day of November, 2010

David J. Kappos
*Director of the United States Patent and Trademark Office*